United States Patent [19]

Sohnemann

[11] Patent Number: 4,511,697

[45] Date of Patent: Apr. 16, 1985

[54] RUBBER MIXTURE FOR DIRECT BONDING TO METAL SURFACES

[75] Inventor: Richard Sohnemann, Northeim, Fed. Rep. of Germany

[73] Assignee: Continental Gummi-Werke Aktiengesellschaft, Hanover, Fed. Rep. of Germany

[21] Appl. No.: 468,653

[22] Filed: Feb. 22, 1983

Related U.S. Application Data

[63] Continuation of Ser. No. 298,958, Sep. 3, 1981, abandoned.

[30] Foreign Application Priority Data

Sep. 8, 1980 [DE] Fed. Rep. of Germany ....... 3033711

[51] Int. Cl.³ .............................................. C08L 61/12
[52] U.S. Cl. .................... 525/139; 524/431; 524/509; 524/511; 525/138; 525/141; 525/142; 525/144
[58] Field of Search ............... 525/140, 138, 139, 141, 525/144, 142; 524/431, 511, 430, 509; 260/783

[56] References Cited

U.S. PATENT DOCUMENTS

| | | | |
|---|---|---|---|
| 3,778,406 | 12/1973 | Klötzer et al. | 260/41.5 A |
| 3,905,947 | 9/1975 | Cowell et al. | 260/775 |
| 4,137,359 | 1/1979 | Bak et al. | 260/775 |

Primary Examiner—Theodore E. Pertilla
Attorney, Agent, or Firm—Becker & Becker, Inc.

[57] ABSTRACT

A rubber mixture is provided for direct bonding to metal surfaces, and includes a base of natural and/or synthetic rubber which contains fillers, processing aids, vulcanizing agents, a bonding agent in the form of a phenol, or derivatives thereof, which form phenolic resins with formaldehyde, a source of formaldehyde, and metallic compounds, preferably oxides of metals, the outer electron shell of which has 2s electrons. The metallic compounds are present in a measured quantity which is about 30 to 400 mMol above the conventional dosage of 40 to 60 mMol for activating the polymerization, with this measured quantity being applicable to each 100 g of rubber. The measured quantity of bonding agent ranges from two to four times the conventional quantity of 40 mMol per 100 g rubber.

10 Claims, No Drawings

RUBBER MIXTURE FOR DIRECT BONDING TO METAL SURFACES

This is a continuation application of Ser. No. 298,958 filed Sept. 3, 1981, now abandoned.

The present invention relates to rubber mixtures for direct bonding to metal surfaces, especially to workpieces of iron, steel, or high-grade refined or superior alloy steels. The mixture comprises a base of natural and/or synthetic rubber which contains fillers, processing aids, vulcanizing agents, a bonding agent in the form of a phenol, or derivatives thereof, which form phenolic resins with formaldehyde, and a source of formaldehyde.

Such mixtures are utilized for coating metallic articles, and provide a bonding to the metal when the metal and mixture are in intimate contact during the vulcanization, i.e. during a common heat treatment.

It is known during vulcanization to bond rubber directly to brass-plated or galvanized steel. This was even successful for only slightly reactive polymers such as EPDM (elastomers made with ethylene-propylene diene monomers) or IIR (isobutene-isoprene rubber) (German Offenlegungsschrift No. 27 50 909). Also successful was the production of a direct bonding with spring steel (German Offenlegungsschrift No. 27 50 836), though restricted to mixtures having a base of reactive polymers such as natural rubber, and exclusive utilization of a bonding system having a resorcinol and hexamethylenetetramine base, with the hexamethylenetetramine having as a rule to be provided in excess.

The utilization of large quantities of hexamethylenetetramine is not possible in many situations, often already solely because this material influences the polymerization too strongly. To obtain a good direct bonding to metals during vulcanization, it is necessary that the speed of the polymerization and bond-forming reactions be coordinated to each other.

It is an object of the present invention to provide a rubber mixture for direct bonding with metals, without the restrictions present during the synthesis of known mixtures, such as exclusive utilization of hexamethylenetetramine, which strongly influences polymerization, and the utilization of only a few polymers. In other words, the mixture proposed has a base not only in relation to the rubber which can be used but also in relation to applicable bonding agents.

This object is realized by the mixture of the present invention; this mixture is characterized primarily by additionally containing metallic compounds, preferably oxides of metals, the outer electron shell of which comprises 2s electrons; in particular, the metallic compounds are present in a measured quantity which is about 30 to 400 mMol above the conventional dosage of 40 to 60 mMol for activating the polymerization, with this measured quantity being applicable to each 100 g of rubber; the measured quantity of bonding agent ranges from two to four times the conventional quantity of 40 to 60 mMol per 100 g rubber.

Especially good results are attained when the molar ratio of phenol, or derivatives thereof, to the source of formaldehyde, compared with the conventional ratio of 2.5:1.5 to 3:1, is either shifted in favor of the formaldehyde source to a value of less than 2.5:1.5 or is increased in favor of phenol or its derivatives to a value of 5 to 10:1.

Above all, the inventively synthesized rubber mixture most of all affords the advantage that with such a rubber mixture a good bonding is attained even with metal surfaces which have not been pretreated. Thus it is unnecessary to pretreat the metal parts, for instance by general cleaning, degreasing, or mechanical roughing.

Since the inventive mixture also has good bonding values with brass-plated of galvanized metal surfaces, the advantage results that during production processes where brass-plated or galvanized rods or plates must first be cut into smaller pieces, whereby along the cuts exposed iron surfaces result, and then these individual pieces are covered with a rubber layer, only a single rubber mixture is necessary which adheres with great bonding not only with the brass-plated surfaces, but also with the exposed metal surfaces.

According to advantageous embodiments of the present invention, resorcinol and hexamethylenetetramine may be used as bonding agent. Alternatively, resorcinol may be utilized as a first bonding agent, whereupon if a general purpose rubber such as NR (natural rubber) or SBR (styrene-butadiene rubber) or a reactive special elastomer such as CR (chloroprene rubber), is used, then the molar ratio of resorcinol to formaldehyde source is approximately 1:1, and if an only slightly reactive elastomer, such as NBR (nitrile-butadiene rubber), or a saturated rubber such as IIR (isobutene-isoprene rubber) and EPDM (elastomers made with ethylene-propylene diene monomers) is used, this ratio is shifted in favor of resorcinol to approximately 5 to 10:1.

Under vulcanizing conditions, small quantities of halogen releasing compounds may be added in a measured quantity of more than 10 mMol per 100 g rubber.

Additional small quantities of metallic compounds, preferably oxides of such metals, may be added to the mixture, with the outermost electron shell of such compounds comprising 2s and 2p electrons.

Additionally, the mixture may include cobalt or nickel compounds in a measured quantity of preferably 5 to 15 mMol metal per 100 g rubber.

It is also within the scope of the present invention to use the inventive mixture in producing conveyor belts having steel cable inserts, vehicle tires with metal parts vulcanized thereto or therein, or other rubber products which include metallic components.

It is particularly possible in connection with the inventively synthesized mixture, to utilize the advantages of adding cobalt or nickel compounds, which in an advantageous manner greatly mitigates or even eliminates the known disadvantageous effects upon the attaining of the bonding during thermal stress of the bonded body.

The utilization of compounds such as chlorinated paraffin, CPE (chloro-polyethylene), CR (chloroprene rubber), etc., which release small quantities of halogen during vulcanization, has proven advantageous in certain situations.

In other applications, it can also be advantageous to add to the inventive rubber mixture small quantities of metallic compounds, preferably oxides of such metals, the outermost electron shell of which comprises 2s and 2p electrons. Thus, adding lead oxide in a preferred measured quantity of 5 to 15 mMol per 100 g rubber has proven successful.

The present invention is naturally not restricted to the mixtures set forth in the following examples. Also, the present invention naturally includes solutions in benzine (gasoline), which are produced from these mix-

EXAMPLE I

| | |
|---|---|
| NR (nitrile rubber) | 65 |
| BR (cis-butadiene rubber) | 35 |
| GPF (general purpose furnace) black | 25 |
| active silicic acid | 25 |
| softener or plasticizer | 10 |
| zinc oxide | 5 |
| lead oxide | 2 |
| a sulfenamide,accelerator | 1.2 |
| sulfur | 4 |
| | 172.2 |

The following were added to this mixture:

| | |
|---|---|
| 50 mMol resorcinol | } 1.4:1 |
| 35 mMol hexamethylenetetramine | |

60 mMol zinc oxide
120 mMol magnesium oxide

By vulcanizing 4 mm steel cables into this mixture for 35 minutes at 150° C., test bodies were produced, with tear-out values determined according to DIN (German Industrial Standard) 22131

These tear-out values, not only for galvanized but also for cables of V2A-steel, were more than 80 N/mm above the required DIN value.

EXAMPLE II

| | |
|---|---|
| CR (chloroprene rubber) | 100 |
| GPF (general purpose furnace) black | 25 |
| active silicic acid | 25 |
| plasticizer | 4 |
| magnesium oxide | 4 |
| zinc oxide | 5 |
| lead oxide | 2 |
| TMTD (tetramethylthiuram disulfide) | 1.5 |
| sulfur | 1.5 |
| | 168.0 |

The following were added to this mixture:
50 mMol resorcinol
35 mMol hexamethylenetetramine
250 mMol magnesium oxide
400 mMol chlorine in the form of chlorinated paraffin with a 70% chlorine content.

In conformity with Example I, test bodies were heated, and had tear-out values, which were tested according to DIN 22131, for galvanized and V2A-cables of 4 mm diameter, of greater than 80 N/mm.

EXAMPLE III

| | | |
|---|---|---|
| EPDM (elastomers made with ethylene-propylene diene monomers) EN(ethylidene norbonene)-type | 100 | |
| active silicic acid | 15 | |
| GPF (general purpose furnace) black | 30 | |
| plasticizer | 15 | |
| zinc oxide | 5 | |
| alkyl phenol resin | 10 | |
| sulfur | 1.5 | |
| cobalt complex in oil | 5 | ≅0.8 |
| | 181.5 | |

The following were added to this mixture:
65 mMol blocked resorcinol
7 mMol methylol melamine ether as a source of formaldehyde
120 mMol magnesium oxide
200 mMol zinc oxide
200 mMol iron oxide
40 mMol chlorine in the form of chlorinated paraffin having a 70% chlorine content.

Again, in conformity with Examples 1 and 2, test bodies vulcanized at 170° C. for 50 minutes had tear-out values which were more than 80 N/mm for galvanized and V2A-steel cables of 4 mm diameter. These values were still obtained after thermal loading for 3 hours at 150° C.

The present invention is, of course, in no way restricted to the specific disclosure of the specification and examples, but also encompasses any modifications within the scope of the appended claims.

What I claim is:

1. A rubber mixture for direct bonding to exposed metallic surfaces, said mixture including:
   a rubber base selected from at least one of the group consisting of natural and synthetic rubbers;
   filler;
   processing aids;
   vulcanizing agent;
   a bonding agent selected from the group consisting of phenol and its derivatives, said bonding agent forming phenolic resins with formaldehyde, and being present to the extent of 80-160 mMol per 100 g rubber base;
   a source of formaldehyde; and additionally having the improvement in combination therewith that the mixture also contains:
   additional metal oxides, the outer electron shell of which has 2s electrons, said additional metal oxides being present to the extent of 70-400 mMol per 100 g rubber to metal base for activating polymerization and a measured quantity of bonding agent increased in a range of from two to four times this extent of rubber base.

2. A mixture in combination according to claim 1, in which said additional metal oxides include those of magnesium; zinc; iron; lead.

3. A mixture in combination according to claim 1, in which the molar ratio of bonding agent to formaldehyde source is less than 2.5 to 1.5.

4. A mixture in combination according to claim 1, in which the molar ratio of bonding agent to formaldehyde source is 5:1 to 10:1.

5. A mixture in combination according to claim 1, in which said bonding agent is resorcinol, which is mixed with hexamethylenetetramine.

6. A mixture in combination according to claim 3, in which said bonding agent is resorcinol, with the molar ratio of resorcinol to formaldehyde source being approximately 1:1 when said rubber base is selected from the group consisting of general purpose rubbers and reactive special elastomers.

7. A mixture in combination according to claim 4, in which said bonding agent is resorcinol, with the molar ratio of resorcinol to formaldehyde source being approximately 5:1 to 10:1 when said rubber base is selected from the group consisting of only slightly reactive elastomers and saturated rubbers.

8. A mixture in combination according to claim 1, which includes small quantities of halogen releasing compounds which are added under vulcanizing conditions to the extent of greater than 10 mMol per 100 g rubber base.

9. A mixture in combination according to claim 1, which additionally includes small quantities of metallic compounds, the outermost electron shell of which comprises 2s and 2p electrons.

10. A mixture in combination according to claim 1, which includes additional metallic compounds selected from the group consisting of cobalt and nickel compounds, said additional metallic compounds being present to the extent of 5 to 15 nMol per 100 g rubber base.

* * * * *